Nov. 9, 1926.
A. W. WHEATON, JR
1,606,278
VALVE OPERATING MECHANISM
Filed May 22, 1925
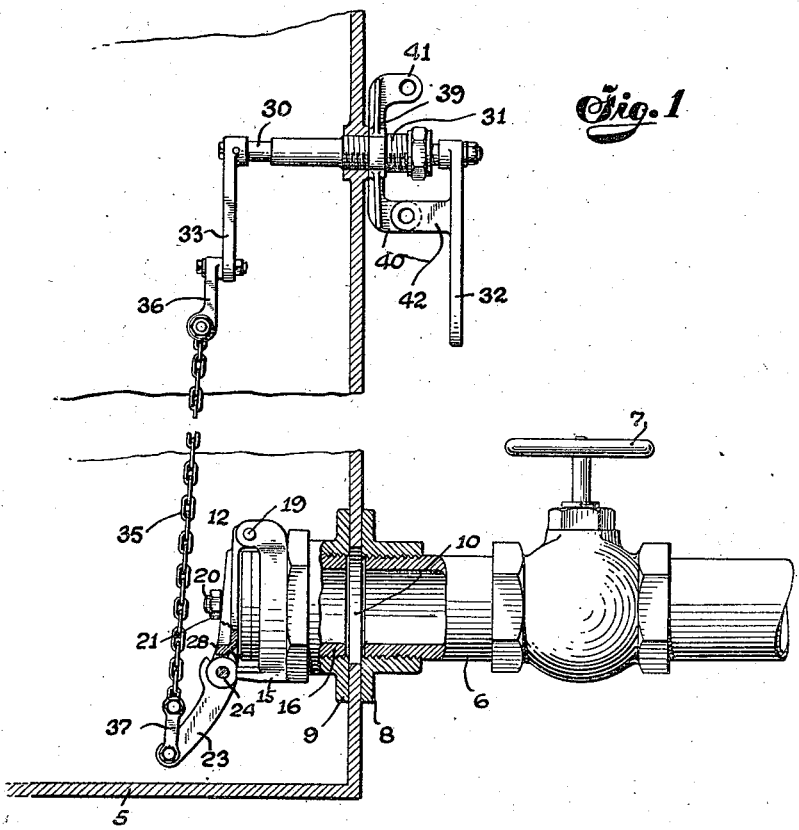
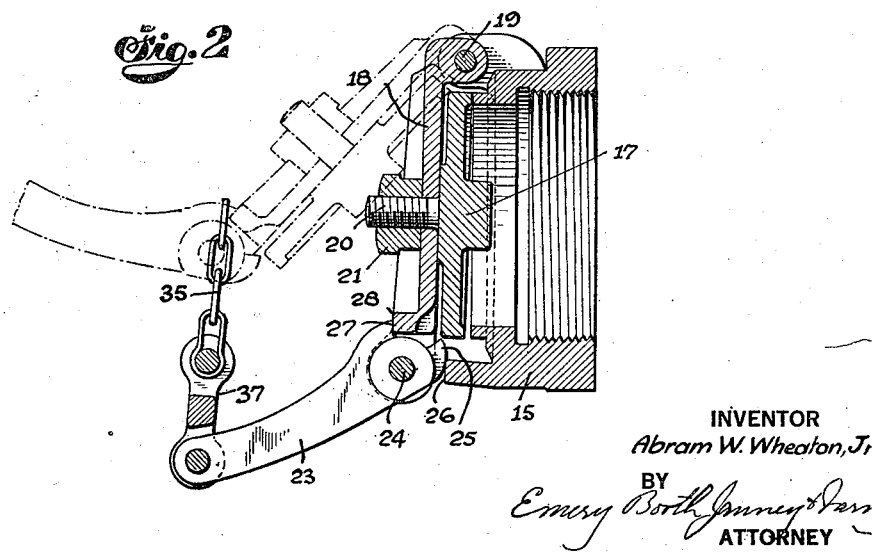
INVENTOR
Abram W. Wheaton, Jr.
BY
ATTORNEY Patented Nov. 9, 1926.

1,606,278

UNITED STATES PATENT OFFICE.

ABRAM W. WHEATON, JR., OF MAPLEWOOD, NEW JERSEY, ASSIGNOR TO A. W. WHEATON BRASS WORKS, OF NEWARK, NEW JERSEY, A CORPORATION OF NEW JERSEY.

VALVE-OPERATING MECHANISM.

Application filed May 22, 1925. Serial No. 31,986.

The present invention relates to valves and valve operating mechanisms, and has for an object to provide an improved valve operating mechanism arranged to operate with greater power during the part of the valve opening movement which is resisted by the greater force.

The invention has been developed in connection with check valves for storage tanks such as are used in combination with service valves, and for convenience such a valve will be described to illustrate the principles of the invention.

The nature and object of the invention will be better understood by reference to a particular description of the selected embodiment of the invention for the purpose of which description reference should be had to the accompanying drawing forming a part hereof, and in which Fig. 1 is a side view partly in section, showing a tank with a valve and valve operating mechanism constructed in accordance with the invention applied thereto.

Fig. 2 is a central sectional view of the check valve, and a part of the valve operating mechanism.

In the construction illustrated, a tank 5 has connected thereto an outlet pipe 6, controlled by a service valve 7.

The outlet pipe is connected to the outer of the two similar threaded flanges 8 and 9 bolted to the wall of the storage tank around an opening 10. A check valve 12 is provided within the storage tank to further close the outlet independently of the service valve.

The valve seat member 15 of the check valve is threaded onto a nipple 16 which engages the threaded pipe flange 9. A valve head 17 seats against the valve seat.

When the valve is opened from fully closed position the first movement of the valve is resisted by the full pressure of the head of liquid thereagainst, but after even a limited flow through the valve is permitted, and especially if the service valve is closed, the resistance is reduced.

The valve operating mechanism shown is arranged so to operate as to cause the power applied to be multiplied considerably during the first part of the valve opening movement.

In the particular arrangement illustrated, the valve head 17 is carried by a lever 18 pivoted at 19 to a fixed support such as a part of the valve seat member. The valve head 17 is provided with a stud 20 which extends through the lever 18 and is secured by a nut 21. Preferably the nut is somewhat loose to permit a slight relative movement of the valve head to insure accurate seating thereof.

A second lever 23 is pivoted at 24 to the lower end of the head carrying lever 18, and this lever is formed with a cam 25 engaging a fixed abutment 26 whereby in operation, the lever 23 may fulcrum against the abutment 26 to move the head carrying lever 18, a predetermined distance. This movement raises the valve head 17 a sufficient distance from its seat to permit a flow, and therefore to relieve the resistance to the opening of the valve. This movement of the lever 23 is limited by a shoulder 27 engaging an abutment 28 of the lever 18. During the further operative movement of the lever 23, the two levers 18 and 23 are rigidly connected, and therefore operate as a unit about the pivot 19, to lift the valve head 17 further from its seat. It will be seen that during the first part of the valve opening movement, the lever 23 of the compound lever arrangement, by fulcruming against the abutment 26, operates in co-operation with lever 18 with a high power coefficient to move the valve head against the pressure of the head of liquid partially to open the valve permitting a limited flow of liquid therethrough, and thereafter the two levers 18 and 23 operate as a unit, at a relatively low power coefficient to move the valve head to its full open position.

Any suitable arrangement may be provided for operating the lever 23. As shown, a shaft 30 extends through a suitable stuffing box 31, on the side of the tank, and has secured thereto arms 32 and 33 on the outside and on the inside of the tank respectively. The arm 33 is connected by a chain 35 and links 36 and 37 to the lever 23.

Means may be provided to limit the movement of the arm 32 and to provide for locking it in either valve opening or valve closing position. As shown a bracket 39 is mounted on the stuffing box 31 and is provided with ears 40 and 41, having perforations which register with a perforation in a lug 42 of the arm 32 to permit locking of the arm 32 in either extreme position by means of a padlock or other suitable device.

It will be noted that the valve operating mechanism shown is of such character that the valve may be lifted automatically from its seat in the event it is desired to fill the tank through the outlet pipe 6 by means of connections not shown.

In the arrangement shown the valve is supported directly upon the tank wall. The lever mechanism operates to apply the valve opening force in such a way as to cause a minimum strain upon the supporting connections.

The description of the particular embodiment of the invention is illustrative merely, and is not intended as defining the limits of the invention.

I claim:

1. A valve comprising, in combination, a valve seat, a valve head arranged to engage the valve seat and means for moving the valve head to open position comprising an element connected to the valve head and arranged to operate during the valve opening operation first as a lever fulcrumed against a fixed abutment and then as an arm rigidly connected to the valve.

2. A valve comprising, in combination, a valve seat, a valve head arranged to engage the valve seat and means for moving the valve head to open position comprising a cam engageable with a fixed abutment and arranged to be rotated during the first part of the movement of the valve moving means to lift the valve head from its seat, said cam being arranged to cease to function as a cam after the valve head has been moved a predetermined distance from the valve seat and to function as an arm rigid with the valve.

3. A valve comprising in combination, a valve seat, a valve head pivotally supported and arranged to seat on said valve seat, operating mechanism for moving said valve head from the valve seat comprising, in combination, a lever arranged to fulcrum against a fixed abutment to lift the valve head a predetermined distance from the valve seat, and thereafter to function as a link during the further movement of the valve head from the valve seat.

4. A valve comprising in combination, a valve seat, a valve head engageable with the valve seat, a compound lever mechanism comprising a lever pivoted to a fixed support on which lever the valve head is carried and a second lever engaging the first mentioned lever and having a portion arranged to fulcrum against a fixed abutment, the said second lever being operable to first move the first mentioned lever while fulcruming against the fixed abutment to lift the valve a predetermined distance from the valve seat and thereafter to move away from said fixed abutment and move the first lever directly.

5. A valve comprising in combination, a valve head engageable with the valve seat, a lever fulcrumed at one side of the valve seat and to which the valve head is secured, a second lever pivotally connected to the first mentioned lever at the side of the valve seat opposite the first fulcrum and arranged to fulcrum against a fixed abutment during a portion of its movement to lift the valve from the valve seat, and arranged to rigidly engage the first-mentioned lever during further movement thereof and to swing with said second lever about the first mentioned fulcrum.

6. A valve comprising in combination, a valve head engageable with the valve seat, a pair of levers pivotally connected to permit a limited relative movement, one of said levers being pivotally supported at one end, and carrying said valve head, the other lever being arranged to fulcrum against a fixed abutment during its movement relative to the first lever to move such first lever and raise the valve from the valve seat.

In testimony whereof, I have signed my name to this specification this 19th day of May, 1925.

ABRAM W. WHEATON, JR.